US006841592B2

(12) United States Patent
Nadolsky

(10) Patent No.: US 6,841,592 B2
(45) Date of Patent: Jan. 11, 2005

(54) WATERFASTNESS ADDITIVES FOR AQUEOUS JET INKS

(75) Inventor: Richard J. Nadolsky, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 231 days.

(21) Appl. No.: 10/198,022

(22) Filed: Jul. 18, 2002

(65) Prior Publication Data

US 2003/0087989 A1 May 8, 2003

Related U.S. Application Data

(60) Provisional application No. 60/307,401, filed on Jul. 23, 2001.

(51) Int. Cl.$^7$ .......................... C09D 11/10; C08L 23/04; C08L 23/10; C08L 23/16; C08L 23/18

(52) U.S. Cl. ...................... 523/160; 524/579; 524/580; 524/581; 524/582; 524/585; 525/327.4; 525/378; 525/379

(58) Field of Search ................................ 523/160, 161; 524/579, 580, 581, 582, 583, 585; 525/327.4, 329.5, 378, 379

(56) References Cited

U.S. PATENT DOCUMENTS

| 3,579,486 A | * | 5/1971 | McConnell et al. ......... 525/285 |
| 3,991,032 A | * | 11/1976 | Pace ........................... 524/88 |
| 5,096,489 A | * | 3/1992 | Laver ...................... 106/31.47 |
| 5,618,338 A | | 4/1997 | Kurabayashi et al. |
| 5,640,187 A | | 6/1997 | Kashiwazaki et al. |
| 5,767,188 A | * | 6/1998 | Kamikuri et al. ............ 524/507 |
| 5,925,712 A | | 7/1999 | Kronzer |
| 5,989,771 A | | 11/1999 | Ohta et al. |
| 6,020,397 A | | 2/2000 | Matzinger |
| 6,020,400 A | | 2/2000 | Anton et al. |
| 6,033,739 A | | 3/2000 | Kronzer |
| 6,045,606 A | | 4/2000 | Matzinger |
| 6,086,661 A | | 7/2000 | Malhotra et al. |
| 6,117,222 A | | 9/2000 | Nigam et al. |
| 6,156,110 A | | 12/2000 | Romano, Jr. et al. |
| 6,176,913 B1 | | 1/2001 | Kasperchik et al. |
| 6,476,096 B1 | * | 11/2002 | Molloy et al. ............... 523/160 |
| 2004/0072960 A1 | * | 4/2004 | Williams et al. ......... 525/329.7 |

FOREIGN PATENT DOCUMENTS

| EP | 0 199 874 A1 | | 11/1986 |
| EP | 0 776 950 A2 | | 6/1997 |
| EP | 853644 | * | 11/1999 |
| GB | 2081274 A | * | 2/1982 |

OTHER PUBLICATIONS

R. A. Work, et al., "Ink Jet Ink & the Challenge of Textile Production Printing," Imaging News, Oct., 1997, pp. 23–24, 55.

"Overview of Jet Ink Compositions," The Imaging Chemicals Report, May, 1999, pp. 1–3.

K. Khoultchaev, et al., "Influence of Polymer–Polymer Interactions on Properties of Ink Jet Coatings," Journal of Imaging Science and Technology, vol. 45, No. 1, Jan./Feb. 2001, pp. 16–23.

* cited by examiner

Primary Examiner—Callie Shosho
(74) Attorney, Agent, or Firm—Madan, Mossman & Sriram P.C.

(57) ABSTRACT

Cationic mordants are described that will not significantly interact with anionic dyes in aqueous jet inks, but will form strong complexes with the dyes on the substrate as the water is absorbed and dissipated. The mordants are cationic amide salts of maleated hydrocarbons, and when in aqueous dispersions have an average particle size of less than one micron. These materials result in less feathering of the ink during printing and improved waterfastness of the ink on a paper substrate.

18 Claims, No Drawings

US 6,841,592 B2

WATERFASTNESS ADDITIVES FOR AQUEOUS JET INKS

CROSS-REFERENCE TO RELATED APPLICATION

This application claims the benefit of U.S. Provisional Application No. 60/307,401 filed Jul. 23, 2001.

FIELD OF THE INVENTION

The invention relates to methods and additives for improving the waterfastness of aqueous jet ink, and most particularly relates, in one non-limiting embodiment, to methods and additives for improving the waterfastness of aqueous jet ink that do not require the use of special papers or modifications to the print head or an extra print reservoir.

BACKGROUND OF THE INVENTION

Aqueous jet inks commonly used in ink jet printers are well known. A goal of those who develop aqueous ink jet formulations is to prevent dye-based aqueous ink jet inks from spreading or feathering on a paper substrate and thereby running into one another. Spreading or feathering blurs the edges of a printed type character and can blur or distort a visual image, reducing the possible resolution of the printer. A further goal of the industry is to provide an ink that will be waterfast upon drying on the paper substrate. Several methods have been used in the past to achieve the first objective. For example, materials that act as mordants for the ink have been incorporated into, or coated onto, the paper substrate to prevent feathering. This approach requires that these specially treated and more expensive papers be used to obtain a better definition of the printed characters.

Alternatively, in some previous approaches an extra jet is provided in the print head to deposit such a mordant on the paper in the same spot that the ink is applied, just prior to application of the ink. This method requires incorporation of extra jets in the print head as well as an extra reservoir to contain the mordant. In addition, further electrical circuitry and programming are required to deposit the mordant in the proper place at the proper time. For both of these methods, mordants used are typically cationic in nature since most of the water-soluble dyes that are used are anionic.

For the second objective of providing a waterfast ink, claims have been made that this too is accomplished by the presence of the mordant. However, only unsatisfactory results have resulted in practice. Alternatively, a water-resistant coating may be laminated over the printed substrate. This however, requires an additional step, as well as additional hardware and coating material and has proven to be too expensive for most applications. A third method for achieving a waterfast ink involves the use of pigments rather than dyes. There are several shortcomings to this approach. For one, it is difficult to obtain and maintain pigments in a sufficiently finely divided state in the ink that they do not block the fine orifices (on the order of 25 microns in diameter) of the print heads. In addition, the color range attainable with pigments is more limited than with dyes.

Thus, it would be desirable if an aqueous jet ink could be developed which reduces the feathering of the ink on the substrate while also improving the waterfastness of the ink once it is dry. It would also be desirable to eliminate the need for special and/or additional equipment or the modification of existing jet ink print heads as well as to avoid any extra steps or layers in achieving the waterfastness goals.

SUMMARY OF THE INVENTION

An object of the invention is to provide an aqueous liquid additive for improving the waterfastness of aqueous jet inks.

Other objects of the invention include providing an aqueous liquid additive for improving the waterfastness of aqueous jet inks that can be added directly to conventional jet ink formulations and used in conventional jet ink printers without modification to the print head and/or without the addition of an extra reservoir.

Another object of the invention is to provide an aqueous liquid additive for improving the waterfastness of aqueous jet inks that also improves the spreading or feathering characteristics of the ink.

In carrying out these and other objects of the invention, there is provided, in one form, an aqueous ink jet formulation that contains at least one cationic amide salt of a maleated hydrocarbon, at least one anionic dye, and water.

DETAILED DESCRIPTION OF THE INVENTION

In the present method, a cationic mordant is selected that will not significantly interact with the anionic dye in the aqueous ink prior to application, but will form a strong complex with the dye on the substrate as the water is absorbed and dissipated. The same cationic materials are selected so that, as the ink dries, these materials lose water and revert to a water insoluble form. It has been discovered that materials suitable to accomplish both functions are amide salts of maleated hydrocarbons. These products may be formed by reaction in water of the maleated hydrocarbon with ammonia or an amine. Additional ammonia or volatile tertiary amine is used to form a salt of the second acid group of the maleate, that is, to neutralize the acid formed. Alternatively, a diamine containing one primary amino group and one tertiary amine group may be used resulting in an inner salt of the formed half-amide. In either case, the amide salt provides the required cationic character to act as a mordant, and the elimination of water converts the water-soluble amide salt to a water insoluble imide, thereby providing water resistance.

One goal of the invention is to produce an aqueous jet ink formulation containing a cationic amide salt, which demonstrates improved waterfastness over an identical formulation that does not contain such a cationic amide salt.

The maleated hydrocarbons of use in this invention may be prepared by grafting maleic anhydride and/or a partial maleate ester made from reaction of maleic anhydride with less than two moles, preferably one mole or less, of a lower alcohol. The maleated hydrocarbon in the amide salt is prepared by a process involving reacting a polymer which includes, but is not necessarily limited to, a polyolefin, a polyolefin copolymer, and mixtures thereof, with a component that may include, but is not necessarily limited to, maleic anhydride or a partial maleate ester made by reacting maleic anhydride with a lower alcohol. Suitable alcohols include methyl, ethyl, propyl, isopropyl, butyl, isobutyl sec-butyl or tertiary butyl alcohol. Suitable hydrocarbons include polyethylene, polypropylene, polybutylene or copolymers of ethylene with propylene, butylene, 1-hexene or 1-octene. These hydrocarbons will range in molecular weight from about 200 to about 6000, preferably from about 600 to about 3000 number average molecular weight. Alternatively, olefins containing 20 or more carbon atoms and having at least 30% of the olefin in the form of alpha olefin may be reacted with the maleate to form an alternating copolymer from the alpha olefin and maleic anhydride. In this case, the internal olefins may react with other olefins and may also add maleate by grafting. This reaction may be conducted using equivalent amounts of olefin and maleate or, more preferably, with extra maleate for grafting. The reactions of hydrocarbons with maleic anhydride/maleate occur by a free radical mechanism and free radical initiators such as alkyl peroxides or hydroperoxides are commonly used. The reactions are generally run at temperatures of 150° C. or higher and are well known to those skilled in the art.

For this invention, the maleated products described above are reacted further in water with greater than 2 moles of ammonia, or at least 1 mole of primary amine and 1 mole of a volatile amine (preferably a tertiary amine) or at least one mole of a diamine containing both a primary amino group and a tertiary amino group, relative to the maleate groups present. As a primary amine, butylamine or a higher boiling primary amine may be employed. As a volatile tertiary amine, one having a boiling point between 80 and 180° C. may be used. Suitable diamines may include N,N-dimethylethylenediamine, N,N-diethylethylenediamine, N,N-dihydroxy-ethylethylenediamine, dimethylaminopropylamine, diethylaminopropylamine, dihydroxyethylaminopropylamine, 2-morpholinoethylamine, 3-morpholinopropylamine or other suitable diamine containing both a primary and tertiary amino group. In all cases, suitable amines will be soluble in water at a level of at least 5% at a temperature of 50–80° C. While many amines may be used in preparing the cationic amide salts of this invention, such as primary, secondary and tertiary amines, in one embodiment of the invention, volatile tertiary amines are preferred to have a greater assurance of improved waterfastness of the resulting inks.

The reactions of amines or ammonia with maleated products are conducted by adding the maleated product in a finely-divided form (i.e., pieces no larger than about 10 mm) to a stirred solution of the amine in water at a temperature of 20–80° C. The mixture, vented to the atmosphere, is stirred and heated to a temperature of 80–95° C. for several hours until a homogeneous solution or dispersion is obtained. After cooling, sufficient water is added with stirring to obtain the desired concentration of solids. A desirable concentration will be one for which the mixture has a viscosity of less than 500 cP (0.5 Pa-s) at room temperature. The mixture is then filtered through a 1 micron filter and the product that passes through such a filter is generally suitable for use in this invention. That is, the average particle size of the amide salts of the maleated hydrocarbons in aqueous dispersions is less than 1 micron.

The amount of cationic amide salt of maleated hydrocarbon in the formulation, based on the total formulation, ranges from about 0.5 to about 3.0 percent by weight of the formulation, preferably from about 1.0 to about 2.0 percent by weight of the formulation.

Although the term "anionic dye" is commonly used as the term for the colorant in the aqueous ink jet formulation of this invention, it is expected that the cationic amide salts will perform well with other dyes, e.g. nonionic and cationic dyes, as well as pigments. Within the scope of this invention, the term colorant refers to either pigments or dyes.

Other additives that are commonly present may include, but are not necessarily limited to, surfactants, emulsifiers, organic solvents and humectants such as glycerol or glycols.

In one non-limiting embodiment of the invention involving application of jet inks to a substrate, the printing method excludes a separate application of a separate mordant (unmixed with a dye) and/or excludes a separate reservoir for a separate mordant.

The invention is further illustrated with respect to the following Examples that are included only to more fully describe the invention without necessarily limiting its scope.

EXAMPLE I

To 150.7 g of deionized water (DI) in a 400 ml beaker containing a magnetic stir bar was added 12.9 g (0.11 mole) of diethylaminoethanol (DEAE) and 36.4 g (0.1 mole of acid) of CERAMER® 1608 (a maleated hydrocarbon product of Baker Petrolite Polymers Division). The mixture was heated with stirring to 80–90° C. and maintained at this temperature for 2.5 hrs. After cooling, DI water was added to make up 200 g net weight. Product solids=20.2%, pH=8.5, viscosity=11.5 cP (0.012 Pa-s), average particle size=0.1 micron. This product readily filtered through both 5 micron and 1 micron filters.

EXAMPLE II

To 1064 g of DI water in a 2 liter stainless steel beaker with a mechanical stirrer was added 51.0 g (0.5 mole) of dimethylaminopropylamine (DMAPA) and 215.0 g (0.5 mole of anhydride) of X-5399 (an experimental olefin/maleic copolymer of Baker Petrolite Polymers Division). The mixture was heated to a temperature of 75–80° C. and stirred while maintaining this temperature range for 3 hrs. Product solids=17.6%, pH=10.1, viscosity=17.5 cP (0.18 Pa-s), average particle size=0.57 microns. An attempt to filter this product immediately blocked up a 5 micron filter.

EXAMPLE III

To 426 g of DI water in a 1200 ml stainless steel beaker with a mechanical stirrer was added 33.6 g (0.33 mole) of DMAPA and 109.2 g (0.30 mole of acid) of CERAMER® 1608. The mixture was heated to 80–90° C. and maintained in this temperature range with stirring for 4 hrs., adding hot water as required to maintain the liquid level. After cooling, DI water was added to a net weight of 568 g. Product had solids=21.5%, pH=9.6 and passed through both 5 micron and 1 micron filters.

EXAMPLE IV

Following the procedure of Example III, a product was made from 560 g of DI water, 29.0 g (0.25 mole) of DEAE and 111.0 g (0.22 mole of anhydride of X-5400 (an experimental olefin/maleic copolymer of Baker Petrolite Polymers Division). This product blocked off a 5 micron filter after only about 25 ml of filtrate had come through.

EXAMPLE V

Following the procedure of Example I, a product was made from 162.0 g of DI water, 14.1 g (0.12 mole) of DEAE and 40.0 g (0.11 mole of acid) of CERAMER® 1608. Product had solids=20.2%, pH=8.5, viscosity=11.5 cP (0.012 Pa-s), average particle size =0.1 micron and passed through both 5 micron and 1 micron filters.

EXAMPLE VI

Following the procedure of Example III, except that a minimum temperature of 78° C. was maintained, a product was made from 332 g of DI water, 22.8 g (0.4 mole) of concentrated Ammonium hydroxide solution and 109.2 g (0.3 mole of acid) of CERAMER® 1608. The product had solids=22.0%, pH=7.9, viscosity=58 cP (0.058 Pa-s) and readily passed through both 5 micron and 1 micron filters.

EXAMPLE VII

The following formulations were made by adding the ingredients in the order given, then stirring for 30 minutes (units are wt %):

Table A

| Material | A | B | C | D | E (control) |
|---|---|---|---|---|---|
| DI Water | 74.0 | 72.0 | 74.0 | 72.0 | 82.0 |
| Product of Ex. III | 8.0 | — | — | — | — |
| Product of Ex. II | — | 10.0 | — | — | — |
| Product of Ex. V | — | — | 8.0 | — | — |
| Product of Ex. IV | — | — | — | 10.0 | — |
| Duasyn Acid Blue* | 3.0 | 3.0 | 3.0 | 3.0 | 3.0 |
| Dipropylene Glycol | 15.0 | 15.0 | 15.0 | 15.0 | 15.0 |

*Water soluble dye solution from Clariant

Half sheets of Econosource Dual Purpose paper (copier paper) were coated with samples of each formulation using a #6 drawdown rod. After allowing to dry overnight, test strips about 1" wide (2.54 cm) were cut from the center of each coated half sheet across the drawdown direction. These were each rinsed with 100 ml of DI water slowly poured down the length of the strip and collected in 400 ml beakers. The intensity of the color of the rinse water was ranked as follows:

E>>D>C>A=B.

The same strips were then each placed in 100 ml of DI water for 2 minutes. After removing from the water and allowing to dry, the color intensities of the strips were ranked as follows

E<<C<B<D=A.

For each ink, six lines were drawn across half sheets of the Econosource paper using Q-tips dipped in the ink. Inks were ranked according to the extent of their penetration to the back of the paper:

E>C>A>D>B.

For each of these half sheets, after air drying for 2 hrs., 5 ml of DI water was allowed to flow slowly across all six lines and the extent of wash out and bleed was observed with rankings from duplicate tests as follows:

B<A<C<D<<E

B<D<A<C<<E.

EXAMPLE VIII

The formulations in Example VII were made with the exception that propylene glycol was substituted for dipropylene glycol. Half sheets of Econosource Dual Purpose paper were coated as in Example VII. Two strips cut from the center of each half sheet were tested 2 hrs and 18 hrs after coating by slowly pouring 100 ml of DI water down the length of each strip and collecting the rinse water in separate 400 ml beakers. The color intensity of the rinse water was ranked on a scale of 0–5 (with 0 being colorless and 5 deep blue)

After 2hrs: E=4, C=D=3, A=B=2

After 18hrs: E=4, B=2, C=A=D=1.

EXAMPLE IX

Based on results from Examples VII and VIII, ink sets a, c and e (corresponding to formulations A, C and E of Example VII, respectively) were made up using the formulation of Example VII with each of the following Clariant dyes:

Duasyn AE-SF LIQ—Acid Blue (C=cyan)

Duasyn XX-SF LIQ—Acid Yellow (Y=yellow)

Duasyn F#B-SF LIQ—Brilliant Red (M=magenta)

Duasyn HEF-SF LIQ—Direct Black (K=black).

These three ink sets (12 inks) were separately applied to half sheets of Econosource Dual Purpose paper as in Example VII (i.e., six lines applied with a Q-tip). Each of the twelve samples were tested as in Example VII by running 5 ml of DI water across the lines and determining the extent of color wash out. Tests were run 4 hrs and 24 hrs after applying the ink, with the following results:

| | 4 hrs | 24 hrs |
|---|---|---|
| Cyan | Ca < Cc < Ce | Ca < Cc < Ce |
| Yellow | Ya = Yc = Ye | Ya < Yc < Ye |
| Magenta | Ma < Mc < Me | Ma = Mc < Me |
| Black | Ka < Kc < Ke | Ka < Kc < Ke. |

Strips (5.5"×1.5"; 14×3.8 cm) of Econosource paper were dipped into each of the 12 inks and left to dry. After about 20 hrs, water was run over each strip until no more color was removed. Strips were then dried in a 95° C. oven and the intensity of the remaining color was determined with the following results:

Cc>Ca>>Ce

Ya=Yc>>Ye

Ma>Mc>>Me

Ka>Kc>Ke.

Using a small bore pipet, several drops of each ink were placed on a fine filter paper (S & S very fine grade) as well as on Econosource paper. After drying in air, the extent of spread of the dots was ranked as follows:

| Filter Paper | Econosource Paper |
|---|---|
| Ca = Cc < Ce | Cc < Ca << Ce |
| Yc < Ya < Ye | Yc < Ya << Ye |
| Mc < Ma < Me | Mc = Ma << Me |
| Kc = Ka < Ke | Kc = Ka << Ke |

EXAMPLE X

Ink sets were prepared using the same dyes as in Example IX according to the following formula:

TABLE B

| Material | a | b | c |
|---|---|---|---|
| DI Water | 67.0 | 67.0 | 75.0 |
| Product of Ex. III | 8.0 | — | — |
| Product of Ex. VI | — | 8.0 | — |
| Dye | 10.0 | 10.0 | 10.0 |
| Dipropylene Glycol | 15.0 | 15.0 | 15.0 |

These were tested, along with a commercial ink set (r) from cartridges obtained from National Laser Cartridge Service, High Ridge, Mo. Tests were run as in Example IX by drawing lines with Q-tips on Econosource paper and, after 4 hrs and 120 hrs, running 5 ml of DI water across the lines, Rankings for extent of wash out were as follows:

| 4 hrs | 120 hrs |
|---|---|
| Cb < Ca << Cr < Cc | Cb = Ca << Cr < Cc |
| Yb = Ya << Yr < Yc | Yb = Ya << Yr = Yc |
| Mb = Ma << Mr < Mc | Mb = Ma << Mr = Mc |
| Kr < Ka = Kb < Kc | Kr < Ka < Kb < Kc. |

The commercial black ink (Kr), believed to contain carbon black rather than dye, exhibited virtually no wash out.

The spreading of dots of ink on Econosource copy paper as described in Example IX gave the following results:

Cb<Ca<Cr<<Cc

Yb<Ya<Yr<<Yc

Mb=Ma<<Mr<Mc

Kr<Kb<Ka<<Kc.

Again, the commercial black ink exhibited less spreading than any of the others, but also had very poor rub resistance.

EXAMPLE XI

Because the color intensity of the experimental ink sets of Example X were lower than those of the commercial ink set, 10% additional dye was added to each of the experimental inks and their pH adjusted to 9.0–9.5 with ammonium hydroxide. Tests of all ink sets (including and OEM set) were run using a HP DeskJet 1200C printer by making multiple copies of the test page on Econosource Dual Purpose paper. These copies were inspected for print quality and ranked in order of the extent of feathering as follows:

B=OEM<A=R<<C.

Only ink set C showed any color bleed on the test pages. Color densities were measured for each formulation using a MACBETH RD918 densitometer with the following results:

TABLE C

| Ink Set | Yellow | Red | Blue | Black |
|---|---|---|---|---|
| OEM | 1.0 | 0.48 | 0.79 | 1.26 |
| R | 1.1 | 0.43 | 0.49 | 1.17 |
| A | 0.89 | 0.42 | 0.57 | 0.96 |
| B | 0.85 | 0.40 | 0.66 | 1.02 |
| C | 0.59 | 0.35 | 0.58 | 0.76 |

Many modifications may be made in the composition and implementation of this invention without departing from the spirit and scope thereof that are defined only in the appended claims. For example, the exact combination of cationic amide salt of a maleated hydrocarbon additive(s) and anionic dye may be different from those used here. Various combinations of cationic amide salt of a maleated hydrocarbon additive(s) with other anionic dyes and additives are also expected to find use in providing improved aqueous ink jet formulations. Further, different maleated hydrocarbons from those discussed and exemplified are also expected to be useful herein.

I claim:

1. An aqueous jet ink formulation comprising:
   at least one cationic amide salt of a maleated hydrocarbon, where the amide salt of a maleated hydrocarbon is added to the formulation as an aqueous dispersion of amide salts where the average particle size in the dispersion is less than one micron;
   at least one colorant; and
   water.

2. The aqueous jet ink formulation of claim 1 where the amide salt of a maleated hydrocarbon comprises a mole ratio of at least one ammonia or primary amine group for every maleate group.

3. The aqueous jet ink formulation of claim 1 where the maleated hydrocarbon in the amide salt is prepared by a process comprising reacting
   a polymer selected from the group consisting of a polyolefin, a polyolefin copolymer, and mixtures thereof, with
   a component selected from the group consisting of maleic anhydride and a partial maleate ester made by reacting maleic anhydride with a lower alcohol having from 1-4 carbon atoms.

4. The aqueous jet ink formulation of claim 3 where the polymer has a molecular weight of from about 200 to about 6000.

5. The aqueous jet ink formulation of claim 3 where the polymer is selected from the group consisting of copolymers of ethylene with propylene, butylene, 1-hexene, 1-octene, and mixtures thereof; polyethylene; polyproplene; polybutylene; and mixtures thereof.

6. The aqueous jet ink formulation of claim 1 where the amide salt is formed by reacting the maleated hydrocarbon by a method selected from the group consisting of
   reacting the maleated hydrocarbon with greater than 2 moles of ammonia per mole of maleic functionality;
   reacting the maleated hydrocarbon with at least 1 mole of a primary amine and at least 1 mole of a tertiary amine per mole of maleic functionality; and
   reacting the maleated hydrocarbon with at least 1 mole of a diamine per mole of maleic functionality, where the diamine has at least one primary amino group and at least one tertiary amino group.

7. The aqueous jet ink formulation of claim 1 where the amount of cationic amide salt of a maleated hydrocarbon in the formulation ranges from about 0.5 to about 3.0 percent by weight based on the total formulation.

8. An aqueous jet ink formulation comprising:
   at least one cationic amide salt of a maleated hydrocarbon, where the amide salt of a maleated hydrocarbon comprises a mole ratio of at least one ammonia or primary amine group for every maleate group and sufficient additional ammonia or amine to neutralize the acid formed, and where the maleated hydrocarbon in the amide salt is prepared by a process comprising reacting
   a polymer selected from the group consisting of a polyolefin, a polyolefin copolymer, and mixtures thereof, with
   a component selected from the group consisting of maleic anhydride and a partial maleate ester made by reacting maleic anhydride with a lower alcohol having from 1-4 carbon atoms;
   where the amide salt of a maleated hydrocarbon is added to the formulation as an aqueous dispersion of amide salts where the average particle size in the dispersion is less than one micron;
   at least one anionic dye; and
   water.

9. The aqueous jet ink formulation of claim 8 where the amide salt is formed by reacting the maleated hydrocarbon by a method selected from the group consisting of:
   reacting the maleated hydrocarbon with greater than 2 moles of ammonia per mole of maleic functionality;
   reacting the maleated hydrocarbon with at least 1 mole of a primary amine and at least 1 mole of a tertiary amine per mole of maleic functionality; and reacting the maleated hydrocarbon with at least 1 mole of a diamine per mole of maleic functionality, where the diamine has at least one primary amino group and at least one tertiary amino group.

10. The aqueous jet ink formulation of claim 8 where the amount of cationic amide salt of a maleated hydrocarbon in the formulation ranges from about 0.5 to about 3.0 percent by weight based on the total formulation.

11. A method for improving the waterfastness of an aqueous jet ink formulation comprising adding thereto at least one cationic amide salt of a maleated hydrocarbon, where the amide salt of a maleated hydrocarbon is added to the formulation as an aqueous dispersion of amide salts where the average particle size in the dispersion is less than one micron.

12. The method of claim 11 where the amide salt of a maleated hydrocarbon comprises a mole ratio of at least one ammonia or primary amine group for every maleate group.

13. The method of claim 11 where the maleated hydrocarbon in the amide salt is prepared by a process comprising reacting a polymer selected from the group consisting of a polyolefin, a polyolefin copolymer, and mixtures thereof, with a component selected from the group consisting of maleic anhydride and a partial maleate ester made by reacting maleic anhydride with a lower alcohol having from 1-4 carbon atoms.

14. The method of claim 13 where the polymer has a molecular weight of from about 200 to about 6000.

15. The method of claim 13 where the polymer is selected from the group consisting of copolymers of ethylene with propylene, butylene, 1-hexene, 1-octane, and mixtures thereof, polyethylene; polypropylene; polybutylene; and mixtures thereof.

16. The method of claim 11 where the amide salt is formed by reacting the maleated hydrocarbon by a method selected from the group consisting of:

reacting the maleated hydrocarbon with greater than 2 moles of ammonia per mole of maleic functionality;

reacting the maleated hydrocarbon with at least 1 mole of a primary amine and at least 1 mole of a tertiary amine per mole of maleic functionality; and reacting the maleated hydrocarbon with at least 1 mole of a diamine per mole of maleic functionality, where the diamine has at least one primary amino group and at one least tertiary amino group.

17. The method of claim 11 where the amount of cationic amide salt of a maleated hydrocarbon in the formulation ranges from about 0.5 to about 3.0 percent by weight based on the total formulation.

18. The method of claim 11 where the waterfastness of the aqueous ink jet formulation is improved over an identical formulation absent the cationic amide salt.

* * * * *